US006964214B2

(12) United States Patent
Wu

(10) Patent No.: US 6,964,214 B2
(45) Date of Patent: Nov. 15, 2005

(54) HANDLEBAR GRIP FOR BICYCLE

(75) Inventor: Kuang-Hui Wu, Taichung Hsien (TW)

(73) Assignee: International Bicycle Products Corporation, Taichung Hsien (TW)

( * ) Notice: Subject to any disclaimer, the term of this patent is extended or adjusted under 35 U.S.C. 154(b) by 87 days.

(21) Appl. No.: 10/389,742

(22) Filed: Mar. 18, 2003

(65) Prior Publication Data

US 2004/0134304 A1 Jul. 15, 2004

(30) Foreign Application Priority Data

Jan. 9, 2003 (TW) .............................. 92200361 U

(51) Int. Cl.[7] ............................................... B62K 21/12

(52) U.S. Cl. .................. 74/551.8; 74/551.9; D12/178; 16/422; 16/436

(58) Field of Search ............................ 74/551.8, 551.9; D12/178; 16/422, 436

(56) References Cited

U.S. PATENT DOCUMENTS 4,381,579 A * 5/1983 Rumpp ........................ 16/436
5,285,698 A * 2/1994 Liao .......................... 74/551.8
D422,543 S * 4/2000 Tamaribuchi .............. D12/178
6,263,759 B1 * 7/2001 Hollingsworth et al. ... 74/551.9
6,421,879 B1 * 7/2002 Gratz et al. ................... 16/422
2004/0129107 A1 * 7/2004 Wu ......................... 074/551.9

FOREIGN PATENT DOCUMENTS

WO WO 9608404 A1 * 3/1996 .......... B62K 21/26

OTHER PUBLICATIONS

Merriam-Webster's Collegiate Dictionary, Tenth Edition, 1999, pp. 894 and 1228.*

* cited by examiner

*Primary Examiner*—Vinh T. Luong
(74) *Attorney, Agent, or Firm*—Browdy and Neimark, PLLC

(57) ABSTRACT

A handlebar grip for bicycle includes a grip member having a hard base and a soft outer layer. The hard base has a straight tubular body and an upright end portion formed integral with the straight tubular body. The soft outer layer is fixedly fastened to and covered on the surface of the hard base.

4 Claims, 4 Drawing Sheets

HANDLEBAR GRIP FOR BICYCLE

BACKGROUND OF THE INVENTION

1. Field of the Invention

The present invention relates to components for bicycle, and more specifically, to a handlebar grip for bicycle.

2. Description of the Related Art

The prior art handlebar grip for bicycle generally mounts a separatable upright device to the rear end thereof for the reason that the rider can hold the handlebar with different ways. A problem with this design is that the grip and the upright device are separately made, the manufacturing cost of this design is high and the installation procedure is complicated. A further disadvantage of the prior art design is that the whole appearance of the handlebar does not cause a sense of beauty.

SUMMARY OF THE INVENTION

It is therefore an object of the present invention to provide an improved handlebar grip for a bicycle, which can be made in such a way that the grip has an upright end portion formed integral with the main body of the grip.

It is another object of the invention to provide an improved grip, which can easily and firmly secure to the handlebar of a bicycle.

It is a further object of the invention to provide a grip, which can cause a sense of beauty.

These and other objects and advantages of the present invention are achieved by providing an improved handlebar grip, which comprises a grip member having a hard base and a soft layer. The hard base has a straight body having a through hole axially extended through the ends thereof, and an upright end portion formed integral with the straight body and outwardly extended from one end thereof. The soft layer is covered on the surface of the hard base.

DETAILED DESCRIPTION OF THE INVENTION

Figure 1:
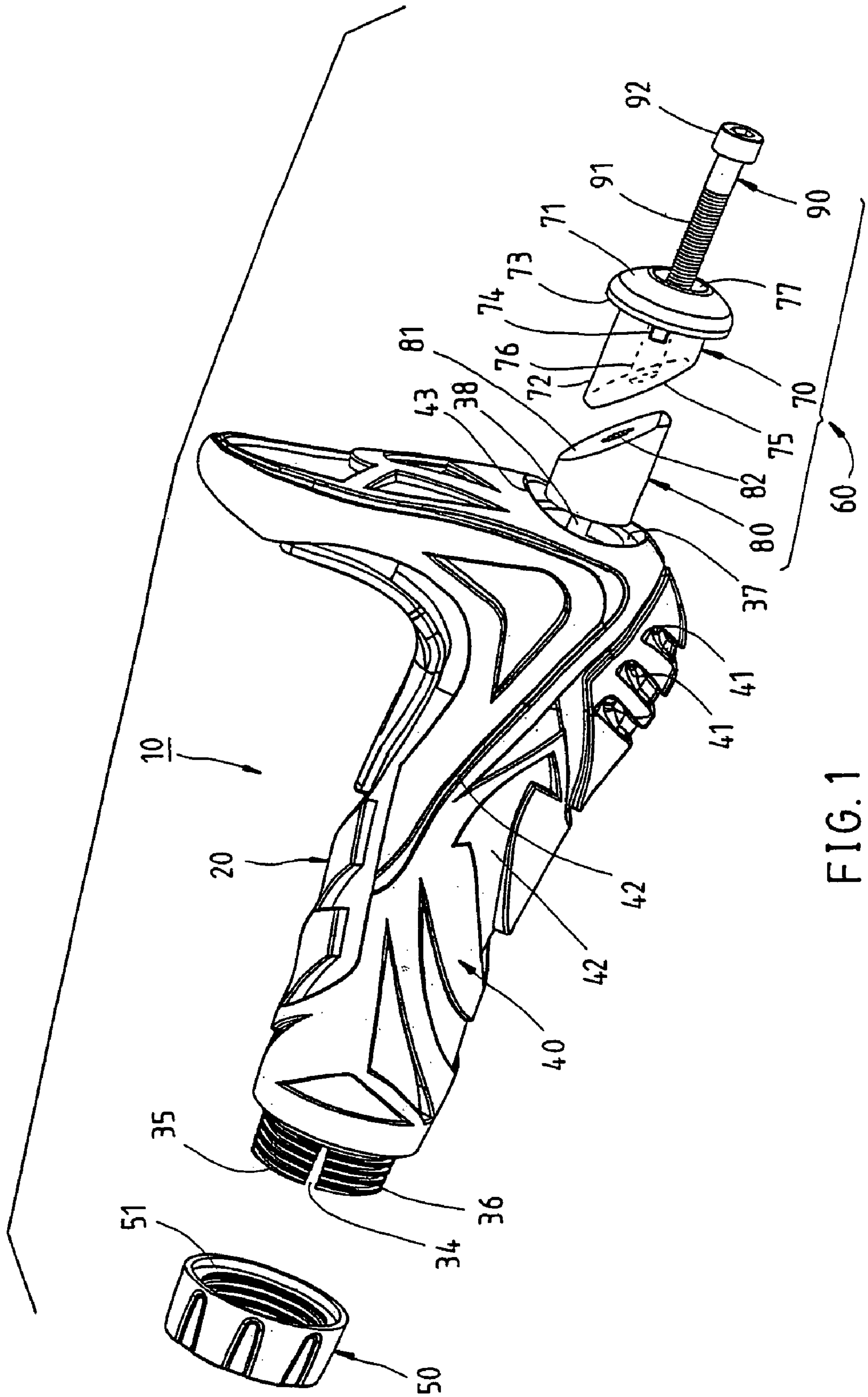
FIG. 1 is an exploded view of a handlebar grip for bicycle according to the present invention.
Figure 2:
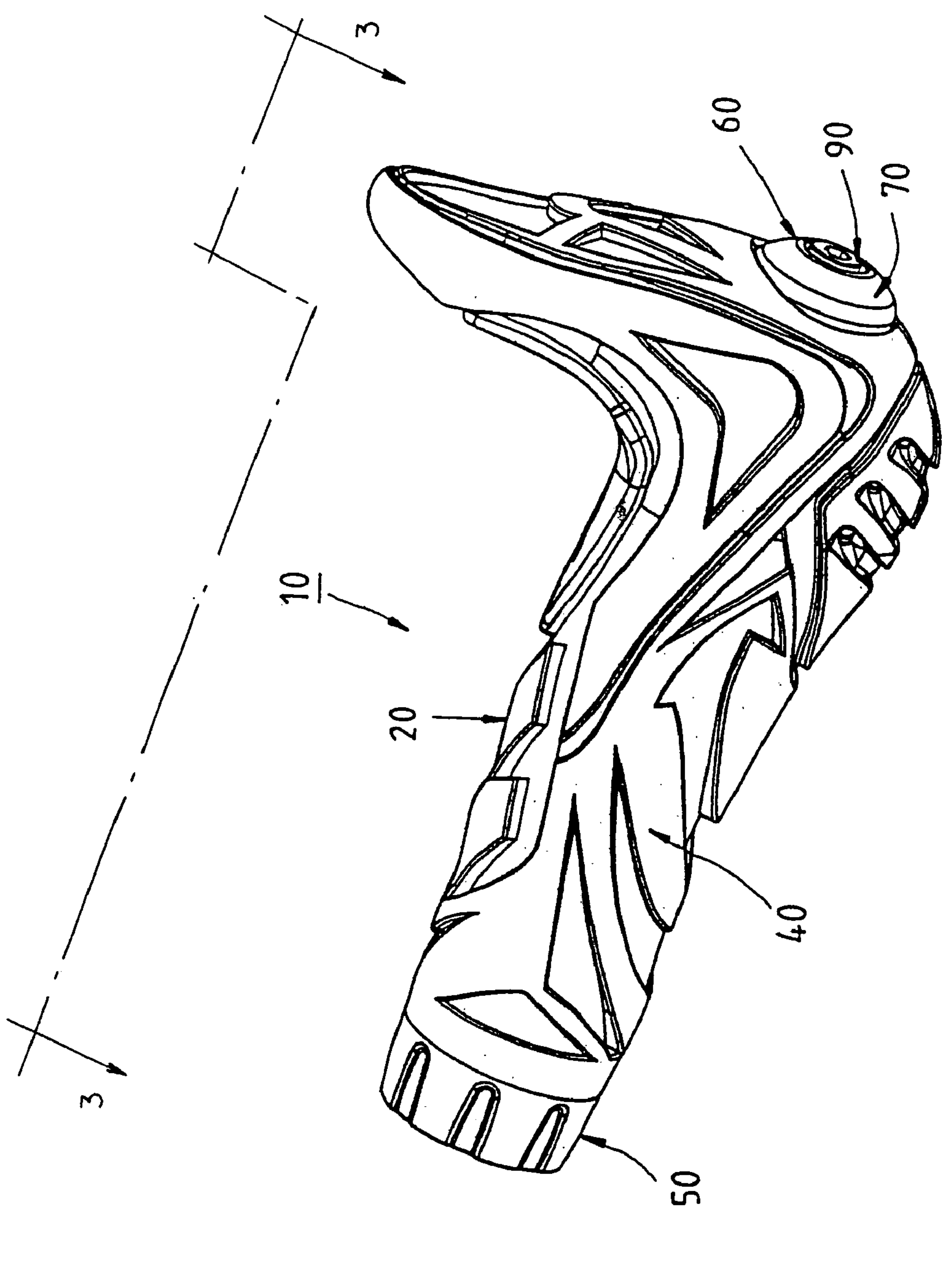
FIG. 2 is an elevational assembly view of the handlebar grip as shown in FIG. 1.
Figure 3:
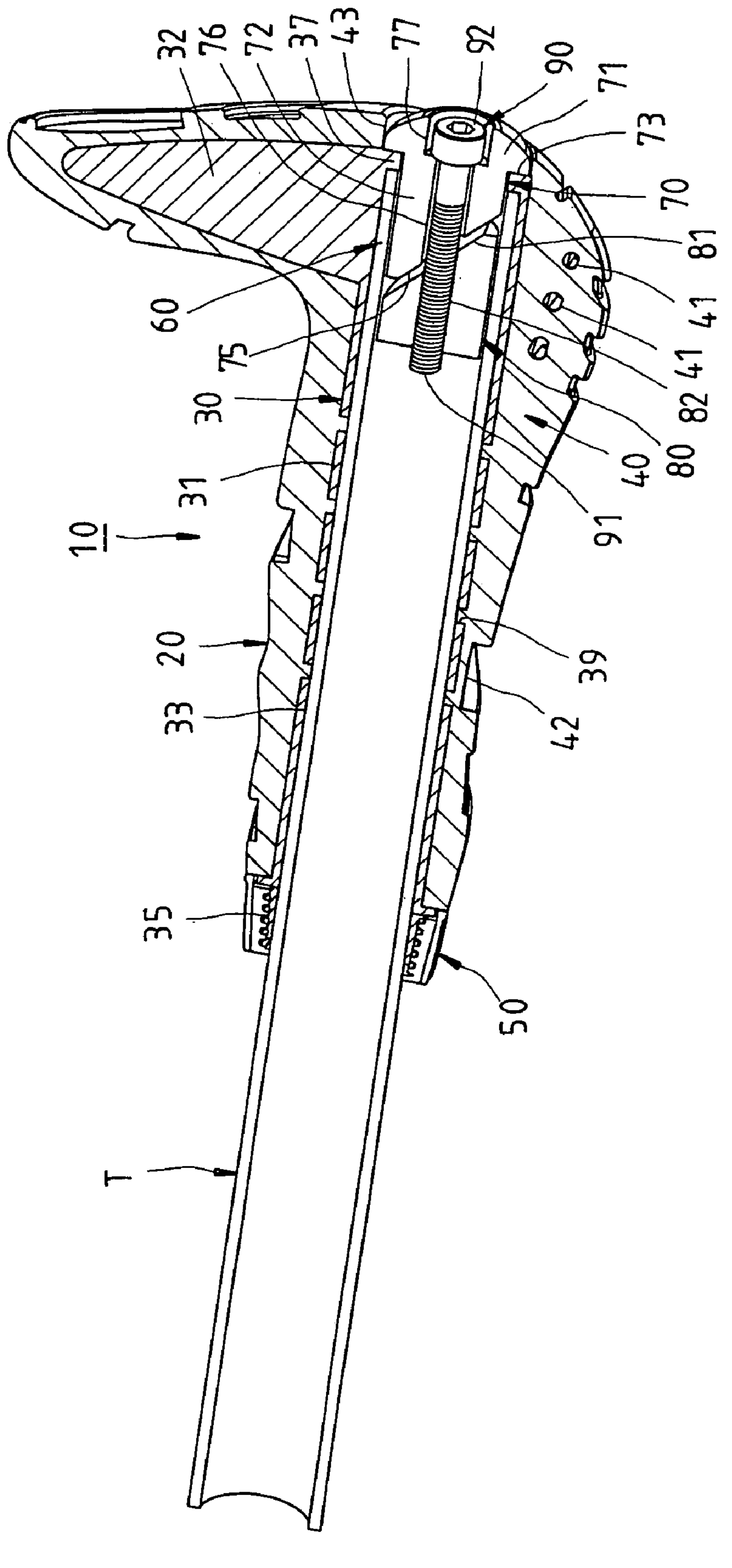
FIG. 3 is a longitudinal view along section line 3—3 of FIG. 2 of the present invention, showing the handgrip mounts to a handlebar.

Referring to FIGS. 1~3, there depicts an embodiment of a handlebar grip 10 within the present invention. The handlebar grip 10 comprises a grip member 20, a chuck 50, and a tightening up means 60.

The grip member 20 comprises a base 30 made of a plastic or metal material having a predetermined hardness by molding. The base 30 comprises a straight tubular body 31 and an upright end portion 32 integral with one end of the body 31. The body 31 defines an axially extended circular hole 33. The diameter of the circular hole 33 fits the outer diameter of the bicycle handlebar T in which the handlebar grip 10 to be installed. The first end of the body 31 has four longitudinally extended splits 34 equiangularly formed therein to separate the first end of the body 31 into four pliable strips

35. Outer threads 36 are formed in the outer walls of the four transversely strips 35. The second end of the straight body 31 has an inside annular flange 37 radially projecting in the circular center hole 33. The inside annular flange 37 has two notches 38 at two opposite sides.

Further, the body 31 has wall holes 39 extended through the wall thereof. The upright end portion 32 extends radially sideways from the periphery of the second end of the body 31, having a substantially tapered profile gradually smaller towards the free end of the end portion.

The grip member 20 further comprises a cover layer 40 covering the base 30. The cover layer 40 can be made of rubber, or plastic materials having a hardness which is lower than that of the base 30. The cover layer 40 is covered on the surface of the body 31 and upright end portion 32 of the base 30 by a secondary molding process. During molding of the cover layer 40 on the base 30, the material (rubber or plastics) fills up the wall holes 39. The cover layer 40 can be molded subject to any of a variety of patterns (not of even thickness) for the gripping of the hand comfortably and positively. For example, the cover layer 40 is made relatively thicker at the area around the second end of the body 31 opposite to the upright end portion 32, and has through holes 41 in the thicker area (the area around the second end of the straight body 31 opposite to the upright end portion 32). The presence of the through holes 41 makes the thicker area of the cover layer 40 more flexible. Further, recessed lines 42 are formed in the surface of the cover layer 40 to cause a sense of beauty and to increase the friction force upon gripping of the hand. The cover layer 40 does not cover the outer threads 36. Further, the cover layer 40 has a circular cavity 43 corresponding to the second end of the body 31.

The chuck 50 has inner threads 51 disposed in the tapered inside wall thereof and adapted to engage the outer threads 36 of the straight body 31. The chuck 50 is mounted on the first end of the grip member 20. When fastening up the chuck 50, the four transversely arched strips 35 are radially inwardly compressed.

The tightening up means 60 is installed in the second end of the grip member 20, comprised of a locating device 70, a tightening up device 80, and a screw bolt 90.

The locating device 70 has a head 71, a shank 72 axially extended from the center of one side of the head 71, and a shoulder 73 formed between the round head 71 and the shank 72. The outer diameter of the head 71 fits the circular cavity 43 of the grip member 20. The outer diameter of the shank 72 fits the inner diameter of the inside annular flange 37 (see FIG. 3). The shank 72 has two wedge blocks 74 symmetrically protruded from the periphery at two opposite sides and respectively abutted against the shoulder 73, and a beveled guide face 75 at the free end (remote from the head 71).

Further, the locating device 70 has a through hole 76 axially extended through the head 71 and the shank 72. The head 71 has a top recess 77 around one end of the through hole 76. The shank 72 is inserted from the second end of the grip member 20 into the inside of the straight tubular body 31 to force the wedge blocks 74 into the notches 38 of the inside annular flange 37, keeping the head 71 fitted into the circular cavity 43 and the shoulder 73 stopped against the inside annular flange 37. When installed, the locating device 70 is prohibited from rotary motion relative to the grip member 20. As an alternate form of the present invention, the locating member can be formed integral with the second end of the straight tubular body of the grip member.

The tightening up device 80 is a cylindrical device axially disposed inside the grip member 20. The outer diameter of the tightening up device 80 is slightly smaller than the inner diameter of the bicycle handlebar so that the tightening up device 80 can be moved axially in the bicycle handlebar. The tightening up device 80 has a beveled guide face 81 at one end adapted to compensate the beveled guide face 75 of the locating device 70, and a hole 82 axially extended through the two ends.

The screw bolt 90 has a threaded shank 91 inserted through the through hole 76 of the locating device 70 and threaded into the hole 82 of the tightening up device 80, and a head 92 fitted into the top recess 77 of the locating device 70.

Figure 4:
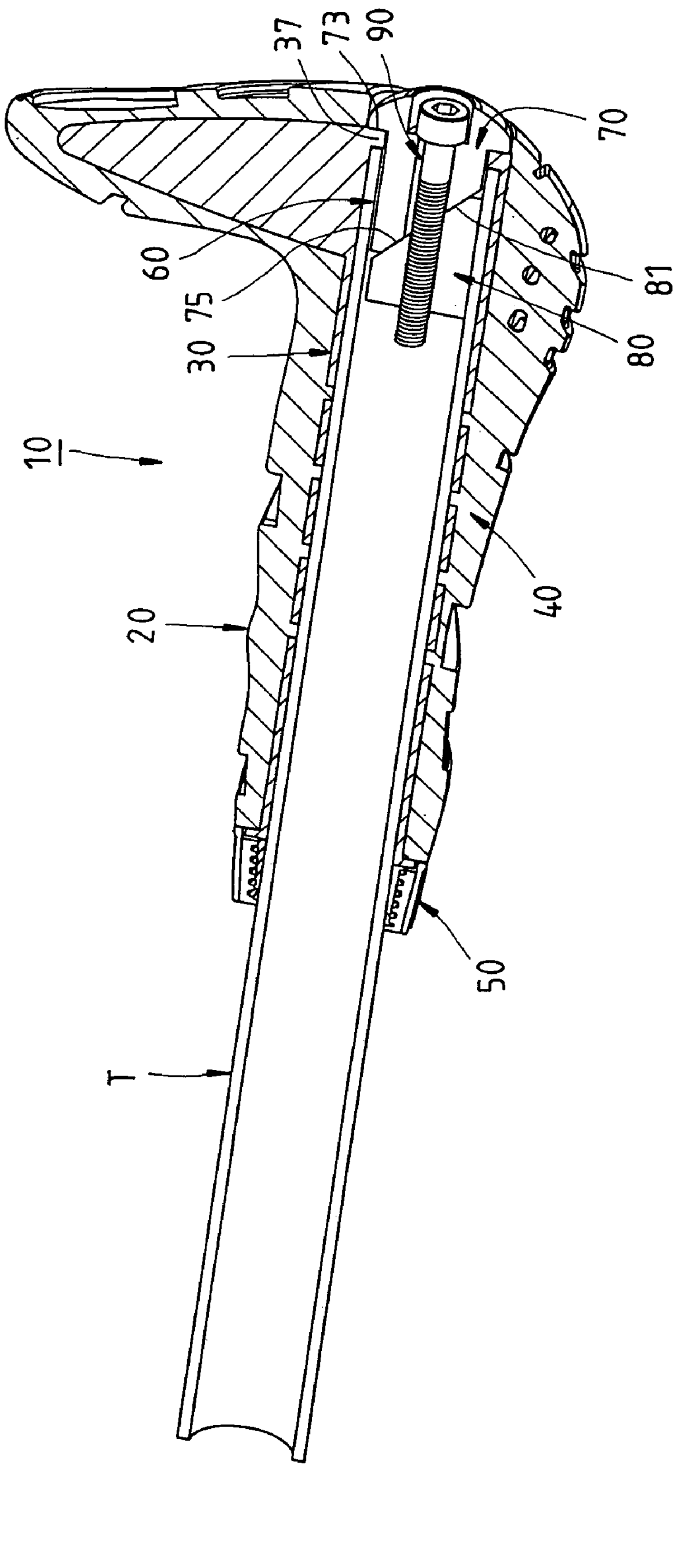
FIG. 4 is similar to FIG. 3 but showing a tightening up means fastened up.

The installation procedure of the handlebar grip 10 is outlined hereinafter with reference to FIGS. 3 and 4. The grip member 20 is sleeved onto the bicycle handlebar T to force the tightening up device 80 and the shank 72 of the locating member 70 into the inside of the bicycle handlebar T, keeping the transversely arched strips 35 extended in direction toward the bicycle handlebar T, the inside annular flange 37 of the second end (outer end) of the grip member 20 stopped at the outer end edge of the bicycle handlebar T (The tightening up means 60 can be installed in the grip member 20 after the grip member 20 has been sleeved onto the bicycle handlebar T). Thereafter, rotate the grip member 20 to move the upright end portion 32 to the desired angle, and then use a suitable hand tool (cabinet tip screwdriver, Phillips head tip screwdriver, or hexagonal wrench) to rotate the screw bolt 90 inwards.

When rotating the screw bolt 90, the tightening up device 80 is rotated through an angle at the initial stage. However, because the distance between the tightening up device 80 and the locating device 70 is designed within a limited range, the tightening up device 80 will soon be stopped by the locating device 70, and prohibited from further rotation. Therefore, continuous rotation of the screw bolt 90, causes the tightening up device 80 to move axially toward the locating device 70 till the beveled guide face 81 closely attached to the beveled guide face 75.

When continuously rotating the screw bolt 90 after the beveled guide face 81 has been closely attached to the beveled guide face 75, the tightening up device 80 and the locating device 70 are radially forced against the inside wall of the bicycle handlebar T in reversed directions (see FIG. 4) to secure the handgrip 10 (more particularly the outer end of the handgrip) to the bicycle handlebar T firmly, prohibiting the handlebar grip 10 from axial displacement or rotary motion relative to the bicycle handlebar T. At final, the chuck 50 is fastened up to compress the transversely arched strips 35 of the grip member 20 radially inwards against the periphery of the bicycle handlebar T. Therefore, the handlebar grip 10 is firmly fixed to the bicycle handlebar T. When removing the handlebar grip 10 from the bicycle handlebar T, reverse the aforesaid mounting procedure.

When riding the bicycle, the rider can selectively hold the middle part of the handlebar grip 10 (the part corresponding to the straight tubular body 31) or the protruded outer end of the handlebar grip 10 (the part corresponding to the upright end portion 32).

For having a construction arranged according to the present invention, the handlebar grip 10 can include the base

30 having the upright end portion 32 formed integral with the straight tubular body 31 at one end thereof. And for being a reason as this, the producing control and installation of the handlebar grip 10 are easier than the prior art grips in which the upright end device is separately fabricated and then installed in the rear end of the grip member. Furthermore, because the soft cover layer covers the upright end portion of the grip member, the handlebar grip gives a nice touch when the user holds the upright end portion of the grip member.

In addition, because the mounting and dismounting procedures of the handlebar grip are simple, users can install the handlebar grip by themselves without any special tools.

What is claimed is:

1. An improved handlebar grip for bicycle, comprising:

a grip member having a hard base and a soft outer layer;

said hard base having a straight tubular body with a through hole axially extended through the ends thereof and an upright end portion formed integral with said straight body; and said soft outer layer disposed on the surface of said hard base;

further comprising a tightening up means adapted to mount said grip member to the bicycle handlebar, said tightening up means comprising a locating device located in a second end of said straight tubular body of said hard base and prohibited from rotary motion relative to said hard base, said locating device having a shank inserted into the inside of the straight tubular body of said hard base and insertable into the inside of the bicycle handlebar and a through hole axially extended through said shank corresponding to the through hole of said straight tubular body, said shank having a beveled guide face in a bottom end thereof; a tightening up device mountable in the bicycle handlebar within the straight tubular body of said hard base and adapted to secure said hard base to the bicycle handlebar, said tightening up device having a beveled guide face disposed in one end thereof and facing said beveled guide face of said locating device, and a screw bolt inserted through the through hole of said locating device and threaded into said tightening up device and adapted to move said tightening up device relative to said locating device.

2. The bicycle handgrip as claimed in claim 1, wherein said hard base is made of a plastic or metal material having a predetermined hardness; said soft outer layer is made of rubber materials having a hardness which is lower than that of the plastic material of said hard base.

3. The bicycle handgrip as claimed in claim 1, wherein said hard base is made of a plastic or metal material having a predetermined hardness; said soft outer layer is made of plastic materials having a hardness which is lower than that of the plastic material of said hard base.

4. The bicycle handgrip as claimed in claim 1, wherein said straight tubular body of said hard base has a plurality of wall through holes, and said soft outer layer fills up said wall through holes of said straight tubular body.

* * * * *